(12) United States Patent
Hewavithana et al.

(10) Patent No.: US 11,616,664 B2
(45) Date of Patent: Mar. 28, 2023

(54) CARRIER FREQUENCY OFFSET CORRECTION AND DOPPLER MITIGATION

(71) Applicant: Intel Corporation, Santa Clara, CA (US)

(72) Inventors: Thushara Hewavithana, Chandler, AZ (US); Yuwen Liu, Beijing (CN); Xuebin Yang, Portland, OR (US); Chenxi Yue, Beijing (CN); Yuzhou Zhang, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 223 days.

(21) Appl. No.: 17/123,193

(22) Filed: Dec. 16, 2020

(65) Prior Publication Data
US 2022/0158870 A1    May 19, 2022

Related U.S. Application Data

(63) Continuation of application No. PCT/CN2020/130250, filed on Nov. 19, 2020.

(51) Int. Cl.
*H04L 25/02* (2006.01)

(52) U.S. Cl.
CPC ........ *H04L 25/022* (2013.01); *H04L 25/0232* (2013.01); *H04L 25/0244* (2013.01)

(58) Field of Classification Search
CPC .............. H04L 25/022; H04L 25/0232; H04L 25/0244
See application file for complete search history.

(56) References Cited

U.S. PATENT DOCUMENTS

| | | | |
|---|---|---|---|
| 8,416,759 B1 * | 4/2013 | Narasimhan | H04W 56/0035 370/344 |
| 2004/0156422 A1 | 8/2004 | Liljestrom | |

OTHER PUBLICATIONS

Suzuki, Hajime et al., "Implementation of Coordinated MIMO-OFDM with Independent Local Oscillators", 2017 IEEE 85th Vehicular Technology Conference (VTC Spring), IEEE, Jun. 4, 2017 (Jun. 4, 2017), pp. 1-5, XP033254227, DOI:10.1109/VTCSPRING.2017.8108236.

Chiueh, Tzi-Dar et al., "OFDM Baseband Receiver Design for Wireless Communications", OFDM Baseband Receiver Design for Wireless Communications, Jan. 1, 2007,XP055748425, SI ISBN: 978-0-470-82234-0, 240 pages.

The extended European Search Report for European Patent Application No. 201196047.1, dated Mar. 23, 2022, 11 pages (For informational purposes only).

* cited by examiner

*Primary Examiner* — Natasha W Cosme
(74) *Attorney, Agent, or Firm* — Viering, Jentschura & Partner mbB

(57) ABSTRACT

Various strategies and devices for same are disclosed to correct for/mitigate frequency offset (such as due to differing accuracies between an oscillator of a transmitting device and an oscillator of a receiving device) and Doppler shift (such as due to a changing relative position between a receiving device and a transmitting device). These strategies may be employed in a MIMO setting, such as, e.g. a stationary base station and a plurality of terminal devices (e.g. user devices, mobile stations, etc.), in which the transmissions for each terminal device may be associated with a different frequency offset and a different Doppler shift.

24 Claims, 15 Drawing Sheets

Two successive data symbols have the same channel response

| 0 | 1 | 2 | 3 | 4 | 5 | 6 | 7 | 8 | 9 | 10 | 11 | 12 | 13 |

Six successive data symbols have the same channel response

| 0 | 1 | 2 | 3 | 4 | 5 | 6 | 7 | 8 | 9 | 10 | 11 | 12 | 13 |

CARRIER FREQUENCY OFFSET CORRECTION AND DOPPLER MITIGATION

CROSS-REFERENCE TO RELATED APPLICATIONS

This application claims priority to PCT Application PCT/CN2020/130250, which was filed on Nov. 19, 2020, the entire contents of which are incorporated herein by reference.

TECHNICAL FIELD

Aspects of this disclosure relate to radiofrequency communication, multiple-input multiple-output (MIMO) radiofrequency communication, carrier frequency offset in radiofrequency communication, and Doppler shift in radiofrequency communication.

BACKGROUND

Radiofrequency transmissions between a transmitter and a receiver may experience frequency offset, such as due to differing accuracies between an oscillator of a transmitting device and an oscillator of a receiving device. Furthermore, in many implementations, one or both of the transmitting device and the receiving device may change position relative to the other device, which may result in a Doppler shift. The frequency offset and/or the Doppler shift many negatively affect the radiofrequency communication, such as by reducing orthogonality of orthogonal frequency division multiplexing (OFDM) symbols, increasing intercarrier interference (ICI), or otherwise. In a MIMO setting, such as, e.g. a stationary base station and a plurality of terminal devices (e.g. user devices, mobile stations, etc.), the transmissions for each terminal device may be associated with a different frequency offset and a different Doppler shift.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary embodiments of the disclosure are described with reference to the following drawings, in which.

DESCRIPTION

Figure 1:
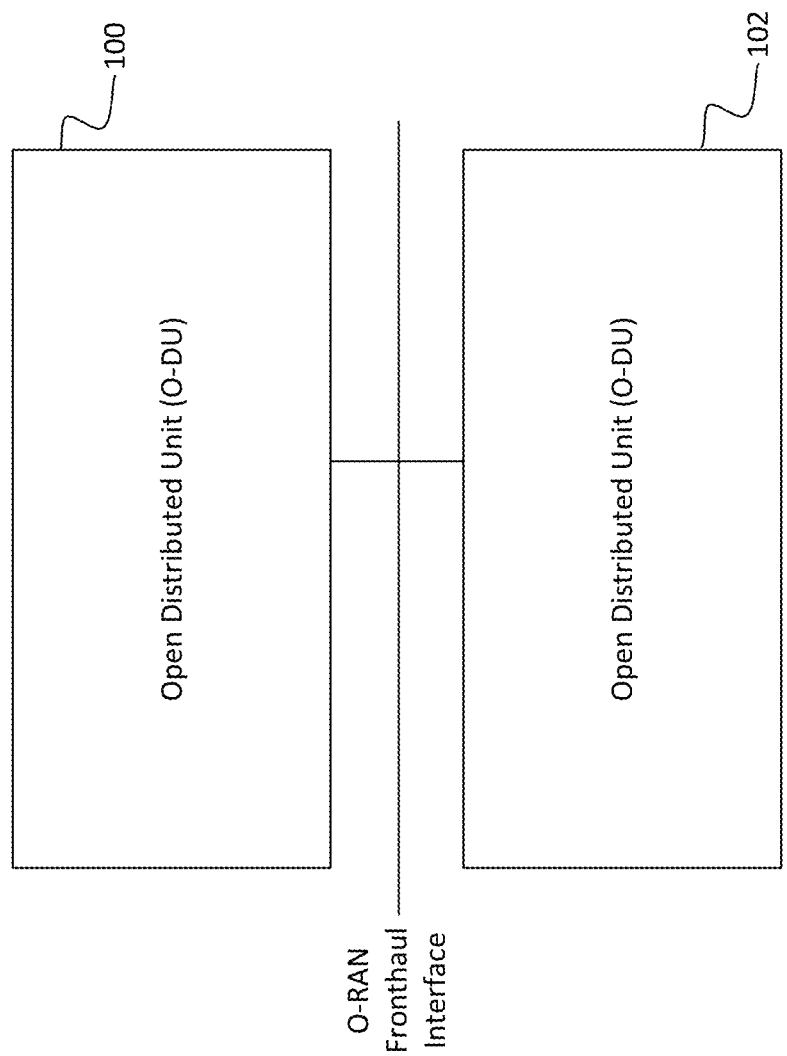
FIG. 1 depicts an example partitioning of an Open-radio unit (O-RU) and open-distributed unit (O-DU) within an O-RAN infrastructure.

The following detailed description refers to the accompanying drawings that show, by way of illustration, specific details and aspects in which the Disclosure may be practiced.

The word "exemplary" is used herein to mean "serving as an example, instance, or illustration." Any embodiment or design described herein as "exemplary" is not necessarily to be construed as preferred or advantageous over other embodiments or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" (BS) used in reference to an access point of a mobile communication network may be understood as a macro base station, micro base station, Node B, evolved NodeB ("eNB"), Home eNodeB, Remote Radio Head ("RRH"), relay point, etc., and may include base stations implemented with conventional base station architectures (e.g. distributed, "all-in-one", etc.) and base stations implemented with centralized base stations architectures (e.g. Cloud Radio Access Network ("Cloud-RAN") or Virtual RAN ("Vran")). As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access ("WiMax") (e.g. according to an IEEE 802.16 radio communication standard, e.g. WiMax fixed or WiMax mobile) and other similar radio communication technologies. Cellular Wide Area radio communication technologies include GSM, UMTS, LTE, LTE-Advanced ("LTE-A"), CDMA, WCDMA, LTE-A, General Packet Radio Service ("GPRS"), Enhanced Data Rates for GSM Evolution ("EDGE"), High Speed Packet Access ("HSPA"), HSPA Plus ("HSPA+"), and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network ("RAN") section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions.

As will be explained in greater detail below, aspects of this disclosure describe the calculation and/or correction of carrier frequency offset. For convenience, the term "carrier frequency offset" is occasionally described herein as "frequency offset", "CFO", or simply "FO". These variations of nomenclature notwithstanding, the terms "carrier frequency offset", "frequency offset", "CFO", and "FO" are intended to be synonymous for the purpose of this disclosure, and no distinction between these terms is intended.

Carrier Frequency Offset

Certain aspects of this disclosure may address inter alia uplink (UL) carrier frequency offset (CFO) challenges associated with LTE or 5G NR base stations (BS). CFO occurs generally when a local oscillator in a receiver does not synchronize with a carrier signal in a received signal. CFO may generally be attributable to a frequency mismatch between the oscillators of the transmitter and the receiver and/or a Doppler effect due to relative motion between the transmitter and receiver. Various strategies exist to attempt to compensate for CFO. Without adequate compensation for CFO, such as between the BS and user equipment (UE) (e.g., smartphone, wearable device, tablet computer, handheld device, laptop, internet of things device, etc.), significant loss in UL throughput may result. Accordingly, various procedures for compensation of CFO are described herein.

According to an aspect of the disclosure, the devices and principles described herein may be implemented within an Open Radio Access Network (O-RAN). O-RAN is a software-oriented open infrastructure Radio Access Network, which may lend itself to a variety of implementations, such as, for example, in LTE, $3^{rd}$ Generation Partnership Project (3GPP) 5G, and/or 3G5G NR New Radio (NR). FIG. 1 depicts an example partitioning of an Open-radio unit (O-RU) and open-distributed unit (O-DU) within an O-RAN infrastructure, according to an aspect of the disclosure. The O-RAN infrastructure may include an open distributed unit (O-DU) 100 and an open radio unit (O-RU) 102. The O-RU may include a Fast Fourier Transform (FFT) and cyclic prefix (CP) removal module (not pictured), which may convert time domain samples into frequency domain OFDM symbols. Frequency domain OFDM symbols may be passed from the O-RU to the O-DU. OFDM symbols may have already been subjected to CFO between the UEs and the BS leading to inter-carrier-interference (ICI) and phase error. Thus, to reach a desired uplink (UL) performance, it may be necessary for the BS to compensate for CFO to mitigate ICI and phase error.

Figure 2:
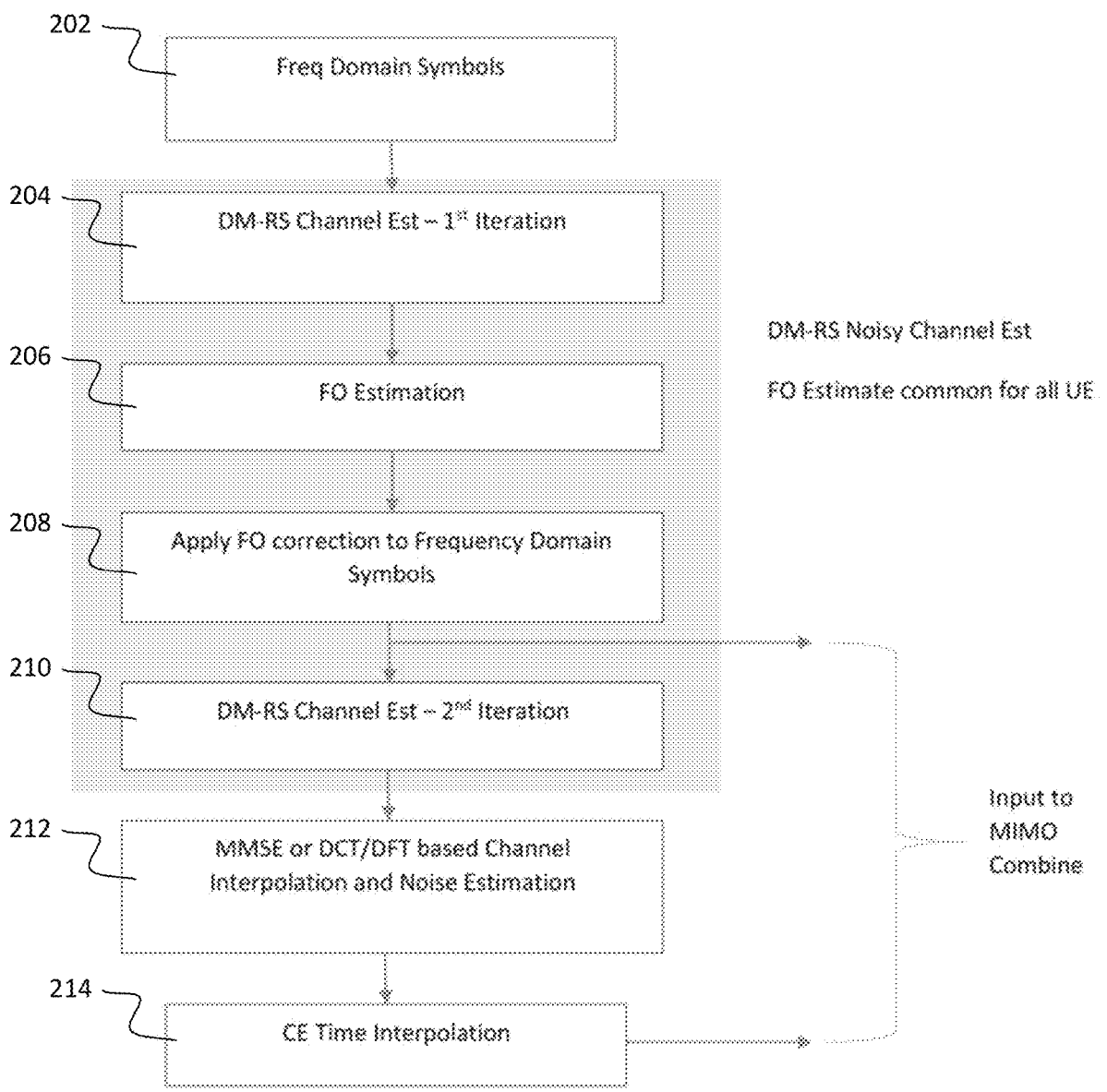
FIG. 2 depicts a conventional CFO compensation algorithm for 0-RAN.

FIG. 2 depicts a conventional CFO compensation algorithm for 0-RAN according to an aspect of the disclosure. In this figure, a radiofrequency device may receive a wireless radiofrequency signal representing a plurality of symbols. The symbols may be received and/or processed in the frequency domain 202. The received symbols may include one or more demodulation reference signals (DM-RS), which may include one or more known or predetermined pilot symbols, and may be used in channel estimation. Otherwise stated, DM-RS symbols may be considered as OFDM symbols with pilot subcarriers present in an UL signal for channel estimation and synchronization.

The radiofrequency device may perform a first iteration of channel estimation using the one or more DM-RS symbols 204. In this manner, a first channel may be estimated for a first DM-RS symbol, and a second channel may be estimated for a second DM-RS symbol. The first iteration of the DM-RS channel estimation may yield channel estimates for each MIMO (single user, SU-MIMO or multiuser, MU-MIMO) layer. The CFO estimate may be averaged over all the layers to calculate a common FO as described below.

In the next step, the radiofrequency device may estimate a frequency offset by comparing the first channel estimation and the second channel estimation 206. The radiofrequency device may then apply the frequency offset to one or more frequency domain symbols 208. In this manner, the frequency offset is determined, and an inverse of the frequency offset is used to correct the frequency offset in the one or more symbols. The radio frequency device may then perform a second iteration of channel estimation, such as based on the received DM-RS symbols 210. In a typical Radio Access Network configuration, DM-RS are only transmitted periodically or intermittently, and therefore one or more non-DM-RS symbols (data symbols) may be transmitted between DM-RS symbols. Such data symbols are generally unknown to the receiving device and therefore cannot be used in channel estimation in the same way as the DM-RS symbols. Nevertheless, because channel instability may be assumed, it may be necessary to interpolate a channel estimation occasionally or periodically between DM-RS symbols. The radiofrequency device may employ various techniques such as the minimum mean Square error (MMSE) estimation and/or discrete cosine transform (DCT)/discrete Fourier transform (DFT) to interpolate a channel estimation between DM-RS symbols 212 in the frequency domain. The radiofrequency device may then interpolate a channel estimation in the time domain, based on the previous calculation 214. According to an aspect of the disclosure, at least the frequency offset corrected frequency domain symbols (as shown in 208) and the time interpolated channel estimation (as shown in 214) may be input into the MIMO processor to decode the one or more symbols. Of particular note, the CFO estimation and correction in this figure may be performed partly or entirely in the frequency domain.

Figure 3:
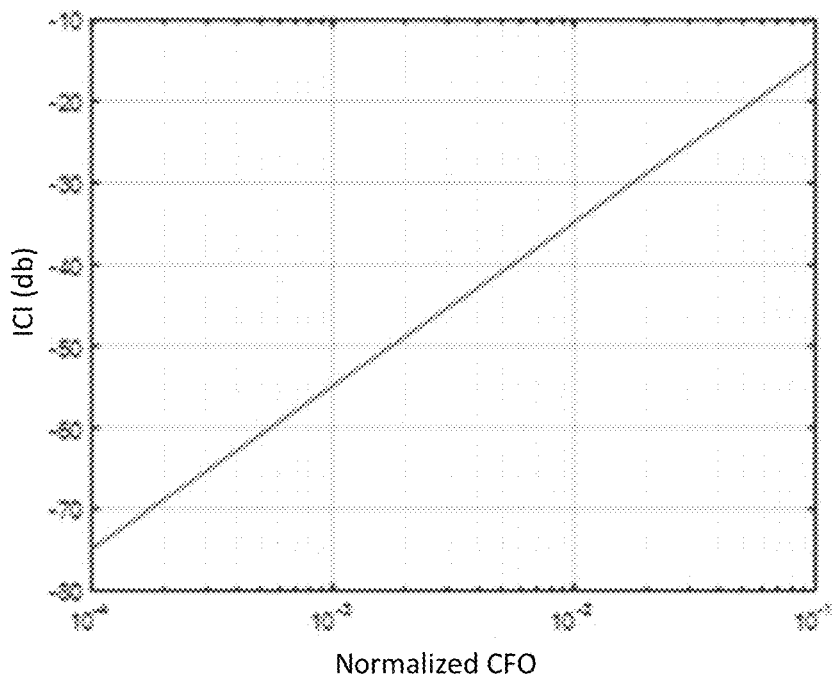
FIG. 3 depicts a demonstrative relationship between CFO and ICI.

FIG. 3 depicts a demonstrative relationship between CFO and ICI. In an ODFM schema, adjacent carrier waves are orthogonal to one another. As such, one wave reaches a maximum value when the adjacent wave is zero. In this manner, interference from neighboring carriers is reduced or eliminated. CFO, however, effectively results in a phase shift of a carrier wave, which renders adjacent waves no longer orthogonal. Thus, one wave may have a non-zero value when the next wave is at its peak. Given the proximity in frequency of the adjacent carriers, this non-orthogonality is likely to result in interference from one carrier to an adjacent carrier, otherwise known as ICI. FIG. 3 shows a linear relationship between normalized CFO and ICI, such that an increase in CFO results in a corresponding, linear increase in ICI. As such, it may be desired to correct for CFO (e.g. modify a received signal to at least partially compensate for CFO) to correspondingly reduce ICI and thus improve the signal-to-noise ratio.

Normalized CFO with respect to subcarrier spacing in this case is 300 Hz/30 kHz=0.01. As depicted herein, this may result in an ICI level of only −35 dB with respect to the subcarrier power level. This may be tolerable for higher order QAMs (e.g. 256 QAM) in a cellular system. However, in situations where a higher carrier frequency is used (hence increasing CFO) or in which the UE has high mobility (Doppler induced CFO), ICI due to CFO can be a significant source of signal-to-noise-ratio (SNR) loss. For example, it is estimated that high speed train situations may result in frequency offsets being in order of kHz leading to ICI levels as high as −20 dB. In this case, compensating for the common frequency offset in time domain can mitigate the ICI due to CFO.

As stated above, the CFO may cause a rotation of the signal and may be compensated by rotating the signal by a corresponding number of degrees in an opposite direction. This number of degrees or magnitude of the CFO may be represented as a phaser. This phaser may be estimated, $P_p^m$, for phase offset, $\theta_p^m$, between two DM-RS symbols for received antenna m and transmitted layer p. (phasor $P_p^m = a_p^m e^{j\theta_p^m}$)

$$P_p^m(l-1,l,k) = \hat{H}_{RS,u}(k,i_l) * \text{conj}(\hat{H}_{RS,u}(k,i_{l-1})) \quad (1)$$

where $\hat{H}_{RS,u}(k,i_l)$ is the DM-RS channel estimate for subcarrier k in DM-RS symbol l, and symbol number index $i_l$ for l=1, . . . , L is the symbol number of DM-RS symbol within the 14 symbol slot (range 0, . . . , 13).

Upon estimating the phasor per transmitter or user, the phasor may be converted to a phase and averaged over all subcarriers to obtain an average phase, calculated as:

$$\theta_p^m(l-1, l) = \frac{1}{K_{dmrs} * d_{dmrs}^{l-1,l}} \sum_{k=1}^{K_{dmrs}} \text{angle}\{P_p^m(l-1, l, k)\} \quad (2)$$

where $K_{dmrs}$ is the total number of DM-RS pilots in one symbol, and $d_{dmrs}^{l-1,l} = i_l - i_{l-1}$ is a distance between two adjacent DM-RS symbols, l−1, and l. The radiofrequency device may then average the estimated phase offset, such as by averaging the phase offset in all receiving antennas, transmitted layers, and all DM-RS symbols, as:

$$\theta = \frac{1}{(L-1) * M_P * M_R} \sum_{l=2}^{L} \left\{ \sum_{p=1}^{M_P} \left\{ \sum_{m=1}^{M_R} \theta_p^m(l-1, l) \right\} \right\} \quad (3)$$

where $M_R$ is the total number of receive antennas; $M_p$ is the total number of transmitted layer numbers from UE; and L is the total number of DM-RS symbols.

Based on the above average phase offset, the frequency offset, (FO), normalized to sample rate, can be calculated as, $$FO = \frac{\theta}{2\pi(N_{fft} + CPSize)} \qquad (4)$$

where $N_{fft}$ is FFT size; and CPSize is Cyclic Prefix Length.

The radiofrequency device may compensate for FO, normalized to the sample rate, in the time domain or in the frequency domain.

For Time Domain Cancellation, the radiofrequency device may compensate for frequency offset directly by applying the estimated frequency offset to the time domain signal as given in:

$$y'(n,l,r) = y(n,l,r)e^{-j2\pi FO(n+n_l)} \qquad (5)$$

where y(n,l,r) is the time domain symbol l=0, ... 13, sample n, for n=0, ..., $N_{fft}$, for Rx antenna r; and $n_l$=(l*($N_{fft}$+CPSize)+CPSize1) is the time offset from the start of the slot to the symbol l FFT window. CPSize1 is the CP size of the first OFDM symbol in the slot, and CPsize refers to CP size for subsequent OFDM symbols. The LTE and 5G NR specifications allow for these to be different values.

For the frequency domain cancellation, the CFO may be compensated for in the OFDM symbols as a phase derotation (symbol number dependent), as:

$$Y'(k,l,r) = Y(k,l,r) * e^{-jl\theta} \qquad (6)$$

where Y(k,l,r) is the received signal on subcarrier k, symbol l and Rx antenna r.

Following the CFO compensation, a second DM-RS stage may be performed to obtain a channel estimate with CFO having already been compensated.

Figure 4:
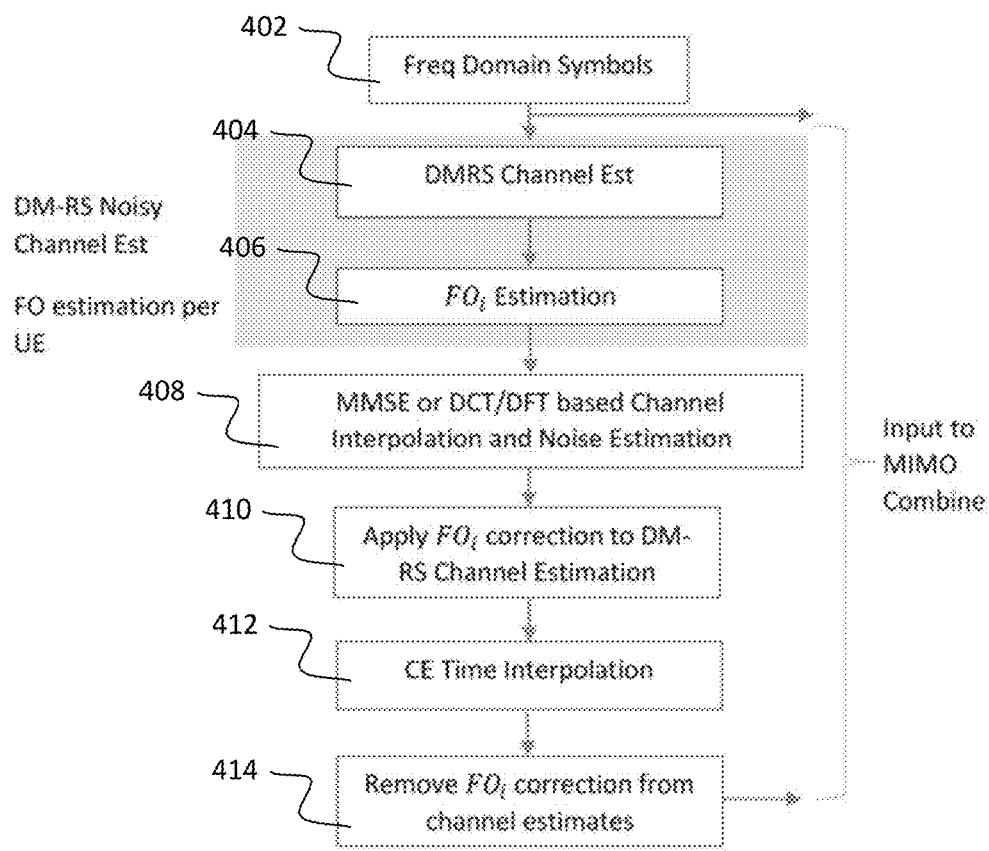
FIG. 4 depicts a procedure for correction of CFO in the frequency domain.

FIG. 4 depicts a procedure for correction of CFO in the frequency domain, according to an aspect of the disclosure. In this procedure, a radiofrequency signal may be received, wherein the radiofrequency signal represents one or more symbols, which may be in the frequency domain 402. The one or more symbols may include DM-RS channel estimation symbols. One or more processors may perform channel estimation using the DM-RS symbols 404. Using at least two channel estimations, and based on a number of symbols between the DM-RS symbols on which the channel estimations were based, the one or more processors may estimate a CFO 406. The CFO estimation may be per user/per user device. For symbols between the DM-RS symbols, the one or more processors may perform a channel interpolation and noise estimation 410. These may be performed, for example, using a minimum mean squared error (MMSE) or discrete cosine transform/discrete Fourier transform (DCT/DFT). The one or more processors may apply a CFO correction to the DM-RS channel estimation 410. The one or more processors may perform a time interpolation of the channel estimation 412. Thereafter, the one or more processors may remove the CFO correction from the channel estimates 414. The frequency domain symbols may be input into the MIMO decoder along with the channel estimates from step 414 for MIMO decoding. In this manner, the MIMO decoder receives the symbols with phase corrected channel estimates.

In this procedure disclosed according to FIG. 4, the angle offset calculation may be simplified by adding phasors instead of angles, where possible. For a given UE, and for a given DM-RS symbol pair, it is expected that the phasors from all RX antennas should be the same. With the knowledge of which layers (e.g., which antenna ports) map to a specific user, the one or more processors may further average over the TX ports from same UE.

Assuming M UEs, where $UE_i$ is assigned ports in set $S_i$, then the one or more processors may calculate the sum of all phasors corresponding to $UE_1$ for DM-RS symbols $l_1$ and $l_2$ (with symbol indices $i_{l_1}$ and $i_{l_2}$ where $i_{l_1} < i_{l_2}$)

$$P_i(l_1, l_2) = \frac{1}{K_{dmrs}|S_i| * M_R} \sum_{p \in S_i} \left\{ \sum_{m=1}^{M_R} \left( \sum_{k=1}^{K_{dmrs}} P_p^m(l_1, l_2, k) \right) \right\} \qquad (7)$$

where $|S_i|$ is the cardinality of set $S_i$.

The scale factor of $$\frac{1}{K_{dmrs}|S_i| * M_R}$$

is not needed in a floating-point implementation. The one or more processors may calculate all $P_i(l_1,l_2)$ for $i_{l_1} < i_{l_2}$ (i.e. $l_1 < l_2$). For example, if only 2 DM-RS symbols were used for channel estimation, then the one or more processors may calculate $P_i(1,2)$. Alternatively or additionally, if 3 DM-RS symbols were used for channel estimation, then the one or more processors may calculate $P_i(1,2)$, $P_i(2,3)$, and $P_i(1,3)$.

The one or more processors may convert the phasors to phase and average the phase over all DM-RS pairs, considering the different distances, to obtain phase offsets between successive OFDM symbols.

$$\theta_i = \frac{\sum_{l_1 < l_2} \text{angle}\{P_i(l_1, l_2)\}}{\sum_{l_1 < l_2} d_{dmrs}^{l_1, l_2}} \qquad (8)$$

where $d_{dmes}^{l_1,l_2} = (i_{l_2} - i_{l_1})$.

Of note, this may be a calculation of the phase offset between two consecutive OFDM symbols, assuming all OFDM symbols have the same symbol length (i.e. same FFT size, and CP). Should different symbols in the slot have different CP lengths, equation (8), above, must be modified accordingly to calculate the distances in terms of samples and therefore the phase offset is between two samples (time domain). Thereafter, the phase offset for any OFDM symbols can be calculated by scaling the per sample phase offset by number of samples between the first symbol and the symbol of interest.

For simplicity, it is assumed in the following that the relevant OFDM symbols all have the same length. Equation (8) implements the MRC combining of angle estimates to obtain an optimal estimate of $\theta_i$. The one or more processors may repeat this calculation for the other UEs. Once the one or more processors calculate the phase offset, equation (4) provides the $FO_i$ from $\theta_i$. It may be necessary not to apply the FO to OFDM symbol data before MIMO detection, since the signals for MIMO detection contain combined signals from all UEs, and since these UEs are expected to each have different CFOs. Since the CFO cannot be adjusted for in the data symbols before MIMO detection, the one or more processors may perform MIMO detection using the channel estimate with the correct phase rotation corresponding to $FO_i$. Since both the data symbols and channel estimation are subjected to the same phase rotation, overall, there is no relative phase error.

The one or more processors may apply FO correction to DM-RS channel estimates as:

$$H'_{UE_i}(k,l,r) = H_{UE_i}(k,l,r) * e^{-jil\Theta_i} \qquad (9)$$

The one or more processors may apply time interpolation to $H'_{UE_i}(k,l,r)$ to obtain interpolated channel $H'_{TIout,UE_i}(k,l,r)$. Following time interpolation (TI), the one or more processors may reintroduce FO to the channel estimate on every symbol, so that the channel estimation phase is aligned with symbol phase, as:

$$H_{TIout,UE_i}(k,l,r) = H'_{TIout,UE_i}(k,l,r) * e^{jl\Theta_i} \qquad (10)$$

However, it may be necessary to compensate for FO induced phase rotation from DM-RS channel estimates to avoid linear time interpolator (TI) severely getting impacted by phase rotation between DM-RS symbols. As such, and following TI, the one or more processors may reintroduce the TO phase rotation (i.e. Remove FO correction) to the Channel response so that the phase is aligned with the phase rotation in the OFDM symbols.

Although the procedure described above with respect to FIG. 4 may produce satisfactory results in some circumstances, this procedure is expected to perform poorly in multiple user MIMO (MU-MIMO) use cases, in which different UEs inevitably have different CFO with reference to the UL BS receiver.

An enhanced procedure and architecture is thus proposed herein to overcome this problem and to yield improved results, such as in MU-MIMO scenarios. This procedure and architecture may also compensate for large carrier frequency offsets and may yield to a lower latency and complexity implementation In this revised procedure, and according to an aspect of the disclosure, the one or more processors may calculate the CFO for individual UEs. Thereafter, the one or more processors may separate the CFO into two components: common frequency offset for all UEs, and residual offset for individual UEs. The one or more processors may compensate for the common CFO before the channel estimation. According to an aspect of the disclosure, this compensation may be performed in the time domain. The one or more processors may compensate for residual per-UE CFO in the MIMO combining phase.

This may help improve the UL performance in practical scenarios, such as where there is considerable CFO for UEs using lower-performing (e.g. lower cost) components in timing circuits. For example, many radio access technology specifications only require the UE to be accurate within 0.1 PPM, which could lead to 300 Hz FO for a 3 GHz carrier frequency. This can cause $2\pi*300*500$ µs=0.94 rad phase error during a 500 µs slot. If not compensated for individual layers from different UEs, as in the procedures described herein, this may lead to significant SNR degradation and throughput reduction. This will now be described in greater detail.

Figure 5:
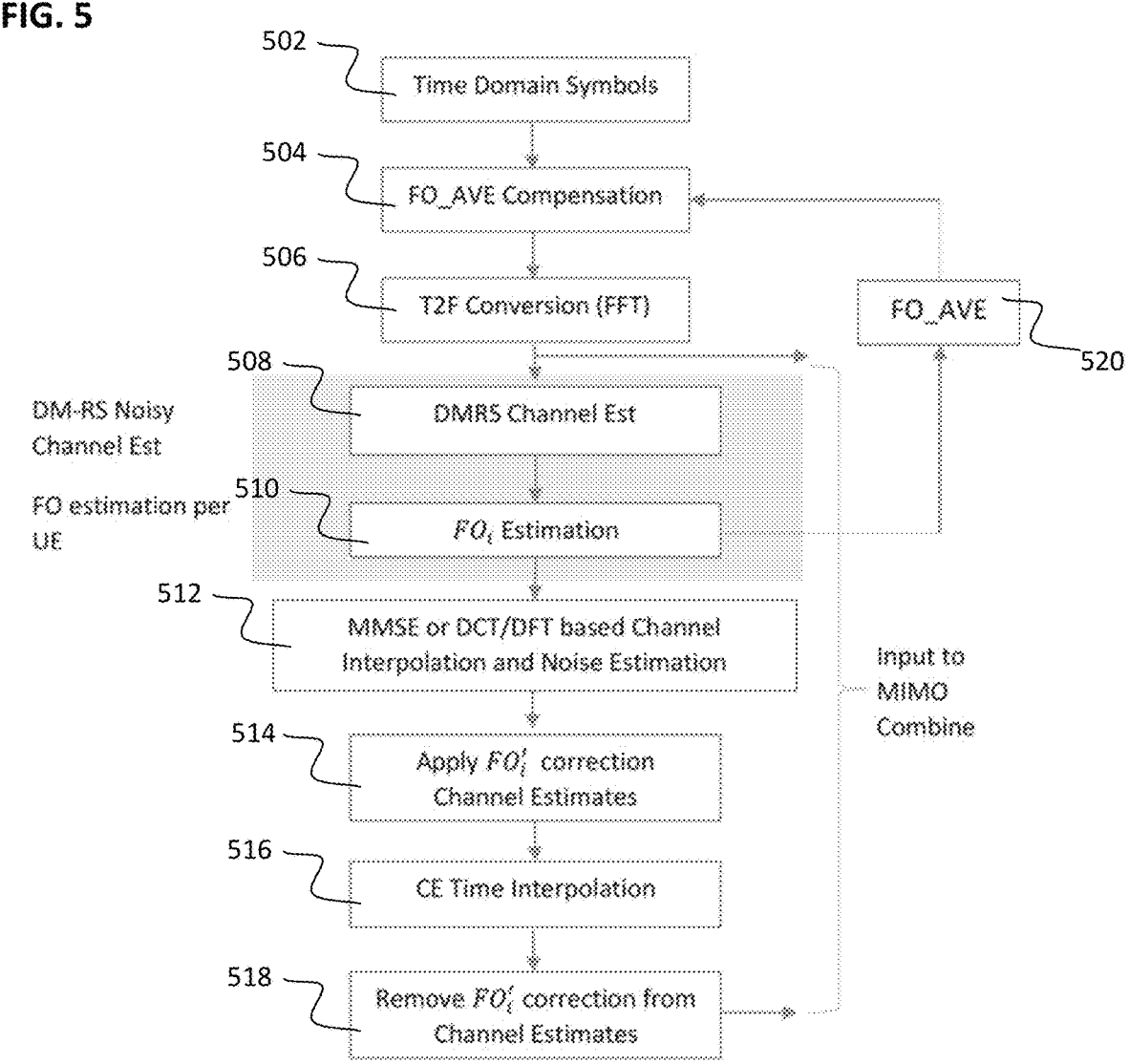
FIG. 5 depicts CFO with compensation in the time domain.

Such addition correction may require that the FO be compensated in the time domain to mitigate ICI. FIG. 5 depicts CFO with compensation in the time domain, according to an aspect of the disclosure. In this case Average Frequency offset (FO_AVE) is compensated in time domain, wherein F_AVE is the average FO estimated over UEs, $FO_i$ for i=1, ..., Num_UEs $$FO\_AVE\_new = FO\_AVE\_old + \frac{1}{Num\_UEs} \sum_{i=1}^{Num\_UEs} FO_i \qquad (11)$$

FO_AVE_old is the average CFO calculated based on individual UE CFOs from the processing of previous slots. FO_AVE_old may be applied to a current slot before calculating the $FO_i$ values for the current slot. Once $FO_i$ values are calculated, FO_AVE_new may be updated, and the current slot may be optionally processed again (second iteration) with the new average CFO. In practice, this may be unnecessary if there is a valid FO_AVE_old from the processing of previous slots. Up to date, per UE, overall CFO values from processing the current slot, FO_AVE_old+$FO_i$, may be stored in a memory and used in future slots to calculate FO_AVE_old for those slots based on the combination of UEs using those slots. The one or more processors may compensate residual FO for each of the UEs, where residual FO $FO_i'=FO_i$ for a single iteration case and $FO_i'=FO_i+FO\_AVE\_old-FO\_AVE\_new$ for a two-iteration case, on layers. The one or more processors may perform frequency domain cancellation and removal of phase offset corresponding to $FO_i'$ for each user, $UE_i$, on the channel estimate for each layer basis (i.e. it may be necessary to identify the TX port(s) for each user).

In FIG. 5, the one or more processors may receive a radiofrequency representing one or more symbols, which may be modified in the time domain 502 as described herein. The one or more processors may determine an average CFO, and the one or more symbols may be modified (e.g. rotated) to compensate for the average CFO 504. The one or more processors may transform the modified symbols into the frequency domain 506 and may perform a DM-RS channel estimation on the transformed symbols 508. The one or more processors may perform CFO estimation for each user 510. The one or more processors may perform an MMSE or DCT/DFT based channel interpolation and noise estimation 512. The one or more processors may apply a per-user frequency offset correction to the channel estimates 514. The one or more processors may perform a channel estimation time interpolation 516 by interpolating a change in the phase corrected channel over time. The one or more processors may then remove the frequency offset correction from the time interpolated channel estimate 518 in preparation for MIMO detection. The MIMO detector may receive as inputs at least the per-user interpolated channel estimates from which the phase correction has been removed (e.g., as depicted in 518) and the phase-domain-converted symbols (e.g., as depicted in 506). Further, when the one or more processors determine per-user frequency offset (e.g., as depicted in 510) the one or more processors may determine an average of these frequency offset calculations to determine the average frequency offset 520, which is used two perform the average frequency offset compensation, as depicted in 504.

The above-described procedure may be performed using an O-RAN architecture, with a slight modification. In an O-RAN architecture, the data received at the DU are already in the frequency domain. As such, a common frequency offset can be passed on to the O-DU for performance of the time domain compensation before the FFT operation.

Figure 6:
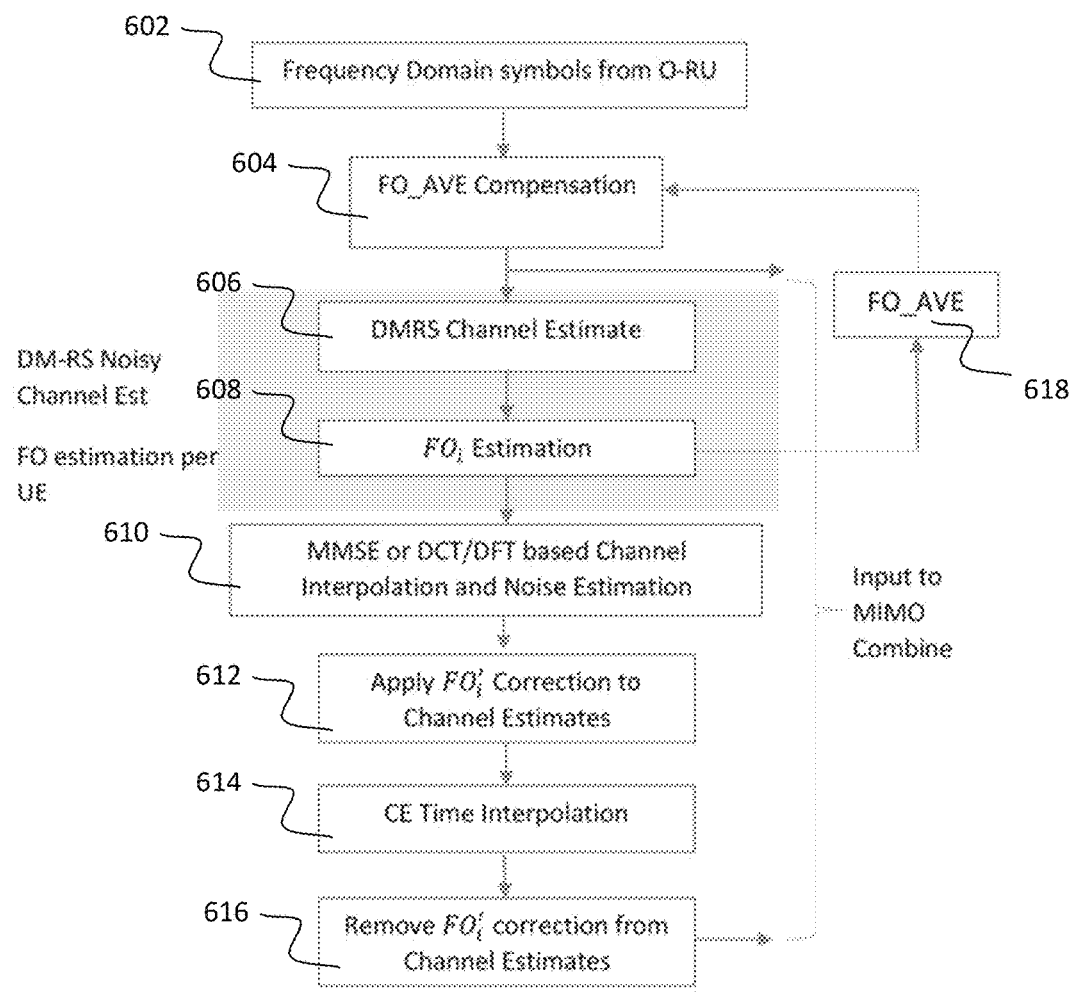
FIG. 6 depicts a procedure for performing the time domain common and CFO compensation in the O-DU.

FIG. 6 depicts a procedure for performing the time domain common and CFO compensation in the O-DU. In this figure, time and frequency domain correction is adapted for use in a FlexRAN environment. Generally speaking, the radiofrequency device may receive one or more radio frequency signals representing one or more symbols. These symbols may be received from the O-RU in the frequency domain 602. One or more processors may determine an average frequency offset and perform a compensation of the average frequency offset to one or more of the receive symbols 604. The receive symbols may include one or more known references such as DR-MS symbols, and the one or more processors may perform channel estimations (e.g. DM-RS channel estimations) using the received reference symbols 606. Using a plurality of channel estimations, the one or more processors may determine an estimation of frequency offset per user or transmitting device 608. The one or more processors may perform an MMSE or DCT/DFT based channel interpolation and noise estimation 610. The one or more processors may apply phase offset correction to the channel estimations 612 and perform a channel estimation time interpolation (e.g. such as for a symbol received after the last DM-RS symbol) 614. The one or more processors may be configured to remove the per-user frequency offset correction from the channel estimations 616 for MIMO processing. The MIMO decoder may receive at least one or more average frequency offset compensated data symbols (e.g. as depicted in 604) and one or more corresponding channel estimations from which the per-user phase correction has been removed (e.g. as depicted in 616). The one or more processors may be configured to receive the per-user frequency offset estimations (e.g. as depicted in 608) and to determine a frequency offset average across all users 618 which is used for average frequency offset compensation (e.g. as depicted in 604). The one or more processors may perform the average frequency offset compensation in the frequency domain or time domain.

For average frequency offset compensation within the frequency domain, FO may be compensated in OFDM symbols as a phase de-rotation (symbol number dependent).

$$Y_{out}(k,l,r) = Y(k,l,r) * e^{-jl\theta\_AVE} \quad (12)$$

This, however, does not mitigate the ICI. As such, this strategy may not improve performance as compared to performance of the CFO correction after the channel estimation. However, it may be desirable to implement average frequency offset compensation within the frequency domain as described herein, such as when simpler architecture is desired or necessary.

Figure 7:
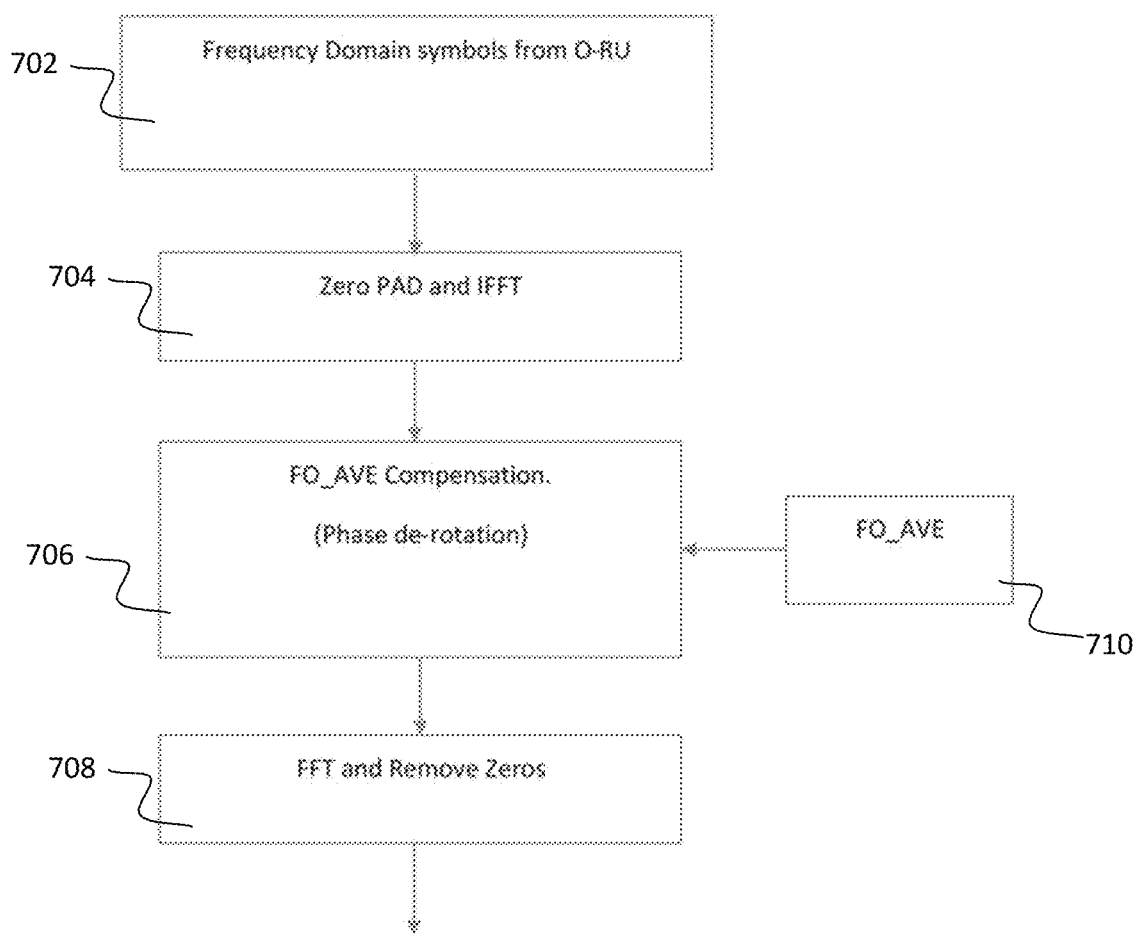
FIG. 7 depicts two possible implementations of average frequency offset, in which time domain compensation of the average frequency offset is performed in a FlexRAN architecture.

Average frequency offset compensation within the time domain may address/mitigate both the phase errors and ICI caused by frequency offset. Frequency domain correction with only phase de-rotation will only correct the phase error. FIG. 7 depicts two possible implementations of average frequency offset, in which time domain compensation of the average frequency offset is performed in a FlexRAN architecture. According to this procedure, the radiofrequency device may receive one or more radiofrequency symbols representing one or more symbols. One or more processors may receive data representing the one or more symbols in the frequency domain from the O-RU 702. The one or more processors may zero-pad the received data and perform a transform such as an inverse Fast Fourier Transform 704.

The one or more processors may perform an average frequency offset compensation (e.g. phase de-rotation) on the one or more transformed symbols 706. The one or more processors may perform a Fast Fourier Transform on the phase D rotated symbols and remove any excess zeros from the zero-padding (see 704, above) 708. The one or more processors may be configured to determine an average frequency offset from the phase de-rotated frequency offset compensated symbols (see e.g. 706) 710.

In some cases, the one or more processors may perform time interpolation of channel estimation only with partial interpolation in the time domain, such as to reduce complexity. In this case, time one or more processors performing the interpolation functions may only calculate the channel estimate for a subset of the received OFDM symbols. The other symbols may use the channel estimate from a nearest OFDM symbol with a time interpolated channel estimate. This will be described in greater detail below.

Consider the MMSE-IRC solution in MIMO combine $$X(k,l) = W(k,l) Y_{out}(k,l) \quad (13)$$

where $$W(k,l) = H_{TIout}^{H}(k,l)(H_{TIout}(k,l)H_{TIout}^{H}(k,l) + R_{NaI}(k))^{-1} \quad (14)$$

Where $R_{NaI}$ is the noise and interference covariance matrix for subcarrier k of symbol l estimated from DM-RS pilots, using DM-RS channel estimates and known DM-RS modulation as follows, $$R_{NaI}(k) = \frac{1}{N\_DMRS} \sum_{l} \{[Y_{out}(k,l) - H(k,l)D(k,l)][Y_{out}(k,l) - H(k,l)D(k,l)]^H\} \quad (15)$$

averaged over the multiple DM-RS symbols. The Noise and Interference covariance matrix for subcarrier k, $R_{NaI}(k,l)$ may be calculated with respect to the FO_AVE corrected signal. Calculation of the MMSE weight matrix, $W(k,l)$ may require the following operations,

| Operation | # of CMAC | e.g. $M_R = 16$, $M_P = 4$ |
|---|---|---|
| $R = H_{TIout}(k,l)H_{TIout}^{H}(k,l)$ | $M_P \times M_R^2$ | 1024 |
| $(R)^{-1}$ | $M_R^3$ | 4096 |
| $H_{TIout}^{H}(k,l)*(R)^{-1}$ | $M_P \times M_R^2$ | 1024 |
| Total | $(2M_P + M_R) \times M_R^2$ | 6144 | e.g. $M_R=16$, $M_p=4$, Number of CMAC=6144.

In real situations, the full calculation of $W(k,l)$ for all symbols can generally be avoided as follows, and assuming that the same time interpolated channel estimate for symbol $l_1$ can be used in symbol $l_2$. When a per-port frequency offset is present, this is only possible at the output of the time interpolator (before the step in which the $FO_i'$ is removed), since the received signals include transmissions from multiple users, each likely having a different phase offset, and thus these differently-phase-offset-compensated signals may not be input into the MIMO detector. Hence the channel estimation post removal of $FO_i'$ step may be given by, $$H_{TIout}(k,l_2) = H_{TIout}(k,l_1) \times G(\theta(l_1,l_2)) \quad (16)$$

where $$G(\theta(l_1, l_2)) = \text{diag}([e^{j(l_2-l_1)\theta_1}, \ldots, e^{j(l_2-l_1)\theta_{M_P}}])$$

refers to relative phase rotation in channel estimate for symbol $l_2$ with respect to symbol $l_1$.

$$W(k,l_2) = G^H(\theta(l_1,l_2)) H_{TIout}^H(k,l_1)(H_{TIout}(k,l_1)H_{TIout}^H(k,l_1) + R_{Nat}(k))^{-1} \quad (17)$$

$$W(k,l_2) = G^H(\theta(l_1,l_2)) \times W(k,l_1) \quad (18)$$

As such, the calculation of $W(k,l_2)$ may require only additional $M_R \times M_P^2$ complex multiplications. For the example given above, this is 256 complex multiplications, which is ~4% of the complex multiplications required for full calculation of the weight matrix.

Figure 8:
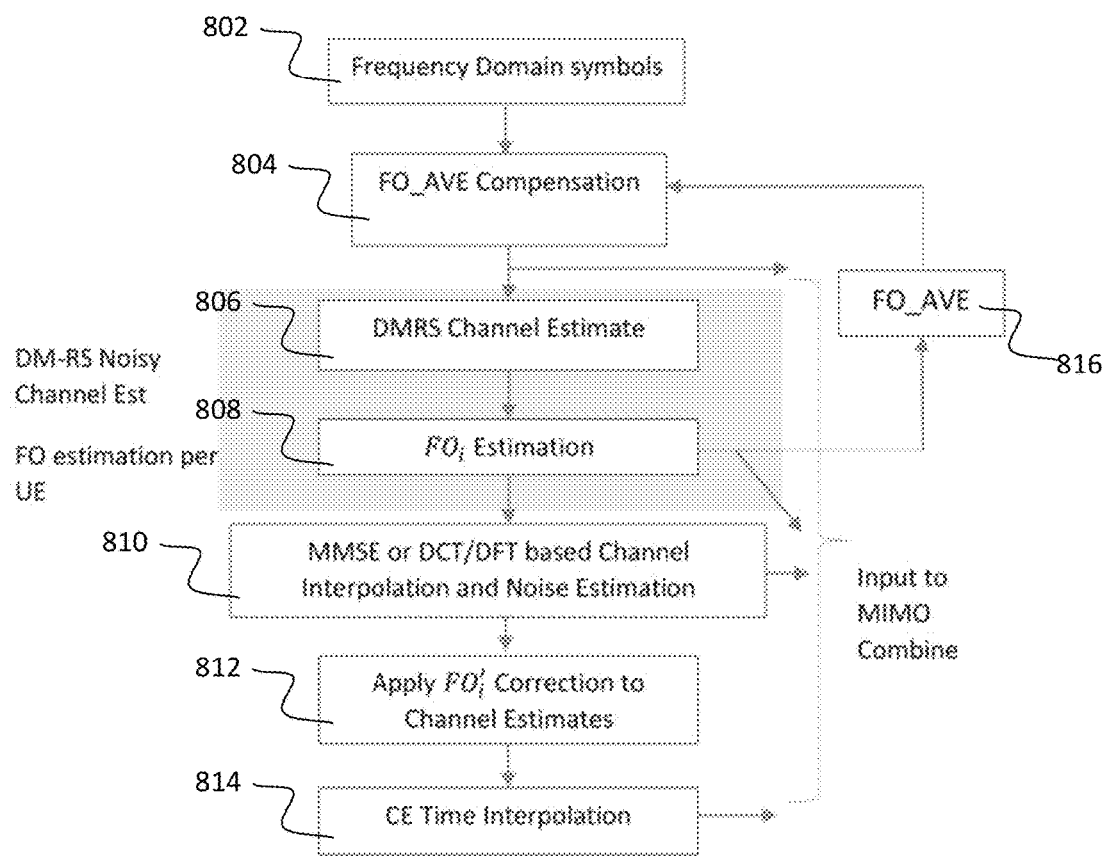
FIG. 8 depicts a simplified architecture, according to an aspect of the disclosure.

In light of the foregoing, it may be desirable to simplify the calculations. FIG. 8 depicts a simplified architecture, according to an aspect of the disclosure. In this figure, the radiofrequency device may receive one or more radiofrequency signals representing one or more symbols. One or more processors may receive data representing the one or more symbols, such as in the frequency domain 802. The one or more processors may perform an average frequency offset compensation 804. The one or more processors may perform a channel estimation, such as by estimating the channel from one or more reference signals, such as DM-RS reference signals 806. The one or more processors may be configured to perform a per-user frequency offset estimation, using a plurality of the channel estimations 808. The one or more processors may be configured to perform MMSE or DCT/DFT based channel interpolation and noise estimation 810. The one or more processors may be configured to apply frequency offset correction to the channel estimations 812. The one or more processors may be configured to perform a channel estimation time interpolation on the frequency offset corrected channel estimates (e.g. as described relative to 812) 814. At least the time interpolated channel estimates 814 and the average frequency offset compensated data symbols 804 may be input into the MIMO detector. Further, the one or more processors may be configured to receive the per-user frequency offset estimations (e.g. as described relative to 808) and to calculate an average frequency offset 816, which may be used for average frequency offset compensation (e.g. as described relative to 804).

FIGS. 2, 4, 5, 6, and 8, include a channel interpolation and noise estimation step, which is generally labeled as "MMSE or DCT/DFT based Channel Interpolation and Noise Estimation". Although it is generally included after the per-user frequency offset estimation, this is for convenience and uniformity of explanation. It is not, however, necessary for the channel interpolation and noise estimation step to be performed after the per-user frequency offset estimation step. Rather, the channel interpolation and noise estimation step may be alternatively performed before the per-user frequency offset estimation. Under some circumstances, it may be desirable to perform the channel interpolation and noise estimation step prior to determining the frequency offset estimation, such as with noise filtered channel estimates. As described above, the average frequency offset may be passed to the O-DU for domain compensation of the CFO and to further simplify the O-DU architecture.

Figure 9:
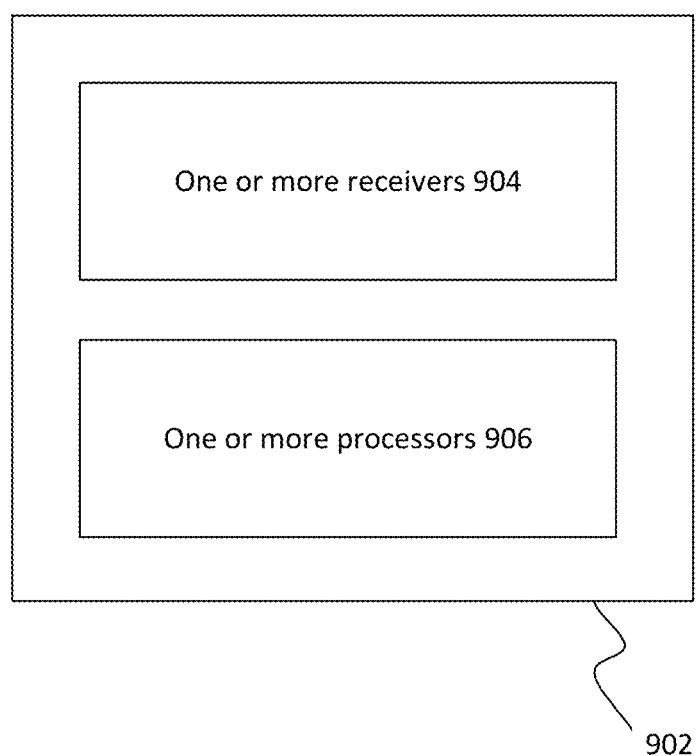
FIG. 9 depicts a radiofrequency device 902 according to an aspect of the disclosure.

FIG. 9 depicts a radiofrequency device 902 according to an aspect of the disclosure. The radiofrequency device 902 may include one or more receivers, configured to receive one or more radiofrequency signals representing a plurality of first symbols and a second symbol, as transmitted by one or more first transmitters; send to one or more processors 906 first data representing the plurality of first symbols, and second data representing the second symbol; and the one or more processors 906, configured to determine a plurality of channel estimates of the first data; estimate a first phase offset value of the one or more first transmitters based on the plurality of channel estimates; interpolate a second phase offset value as a phase offset of the second data based on the first phase offset value and a number of symbols relative to time between one of the plurality of first symbols and the second symbol; generate a first phase corrected channel estimate by modifying one of the plurality of channel estimates of the first data by the second phase offset value; generate a time-interpolated channel estimate by modifying the phase corrected channel estimate based on the number of symbols relative to time between one of the plurality of first symbols and the second symbol; generate a first inverse-phase corrected time-interpolated channel estimate by modifying the time-interpolated channel estimate by an inverse of the second phase offset value; and detect the second symbol based at least on the second phase offset value and the inverse-phase corrected time-interpolated channel estimate.

Doppler Mitigation.

Accurate channel response information is important to achieve high receiver-performance. In various radio access technologies (e.g., LTE or New Radio (NR)), DM-RS symbols may be inserted on specified OFDM symbols and algorithms such as, but not limited to, discrete cosine transform (DCT) or minimum mean square error (MMSE) may be applied to estimate the frequency domain channel response on these symbols.

The wireless channel is known to vary relative to time due to relative movement between transmitter, receiver or environment, and as such, an interpolation/extrapolation algorithm may be applied to obtain a channel response for affected data symbols. Although fine interpolation granularity may achieve acceptable or even good performance, such fine interpolation granularity may also require a sizeable computational workload, which may result in significant or even undesirable power consumption, and large latency. Thus, it may be desirable to select an appropriate interpolation granularity as a compromise between performance and computational complexity.

Doppler shift estimation in the receiver(s) is one key parameter for MMSE channel response interpolation. It may decide the accuracy of the correlation matrix and thus significantly affect MMSE channel response interpolation performance. Doppler shift estimation in the receiver is also a good indicator for a desirable interpolation granularity, since it represents the channel response changing speed with both carrier frequency and moving speed being taken into consideration. Accordingly, estimated Doppler shift may be utilized to select an appropriate interpolation granularity.

Conventional implementations of Doppler shift estimation typically only obtain acceptable or even good performance at high signal to noise ratios (SNR). At low SNRs, the estimation performance is often poor or even unacceptable.

The Doppler shift estimation procedures described herein, and the corresponding architecture, may improve the Doppler shift estimation performance and solve various implementation challenges. According to an aspect of the disclosure, these procedures and corresponding architecture may aid a FlexRAN reference design in achieving high performance without the conventionally-accompanying increase in computation workload.

Figure 10:
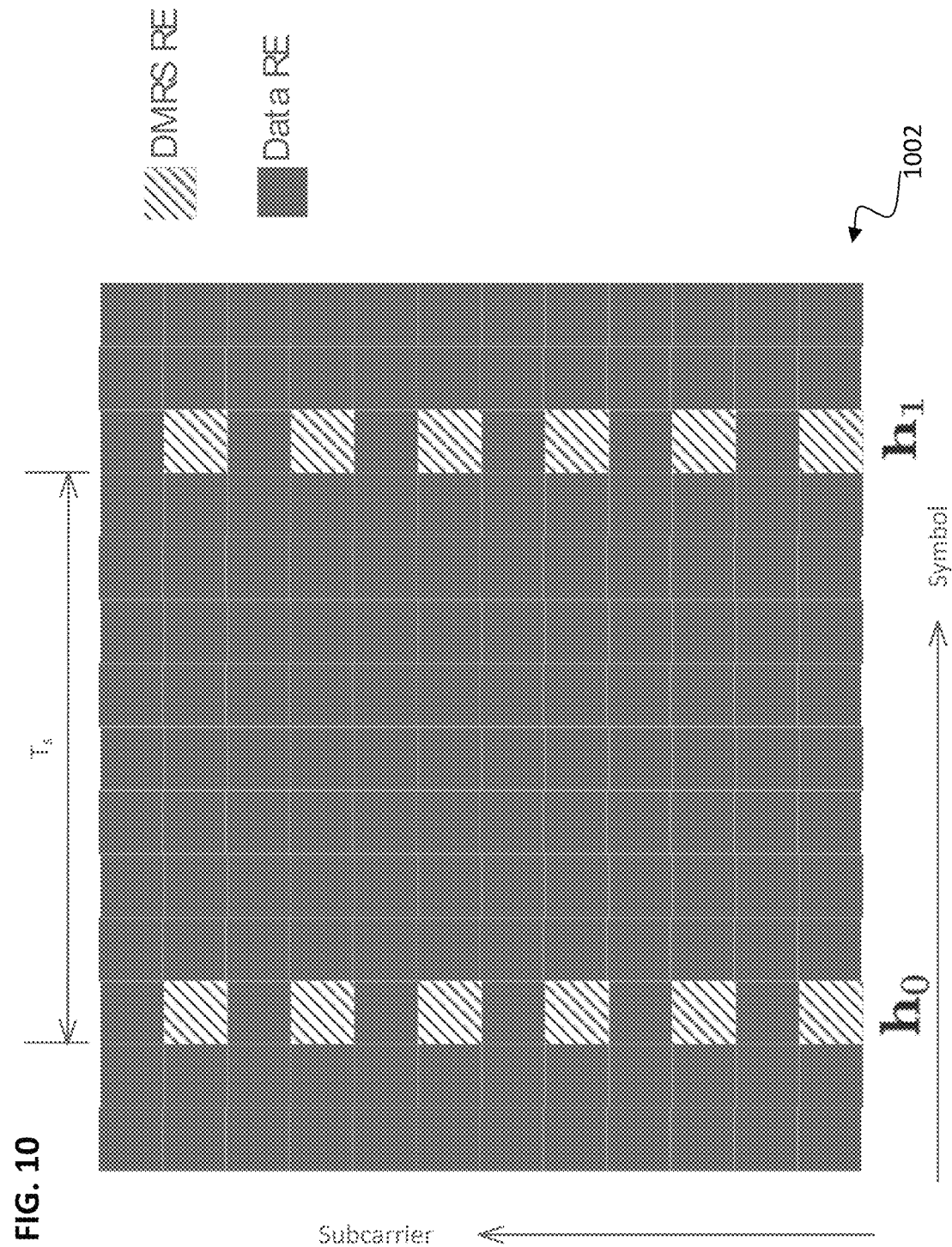
FIG. 10 depicts an example of resource element (RE) allocation in an NR frame structure.

FIG. 10 depicts an example of resource element (RE) allocation in an NR frame structure 1002. According to this figure, a radiofrequency device may receive a plurality of symbols relative to time. The symbols may be grouped into slots (one slot is depicted herein). The plurality of symbols may be further grouped in a plurality of subcarriers (indicated along the vertical axis), indicating simultaneous or concurrent transmission of symbols within a plurality of frequencies. As shown herein, the symbols may be data symbols or reference symbols (e.g. DM-RS symbols). The reference symbols may include one or more known or predetermined pilot symbols which are transmitted for the purpose of channel estimation. When a radiofrequency device receives such reference symbols, the radiofrequency device may perform a channel estimation to estimate the channel between the transmitter and receiver based generally on a difference between the known or predetermined pilot symbols and the known or predetermined pilot symbols as received at the receiver. Various radio access technologies include schedules for transmission of the reference symbols. As shown in this figure, for example, between four and eight data symbols may be transmitted between reference symbols.

Figure 11:
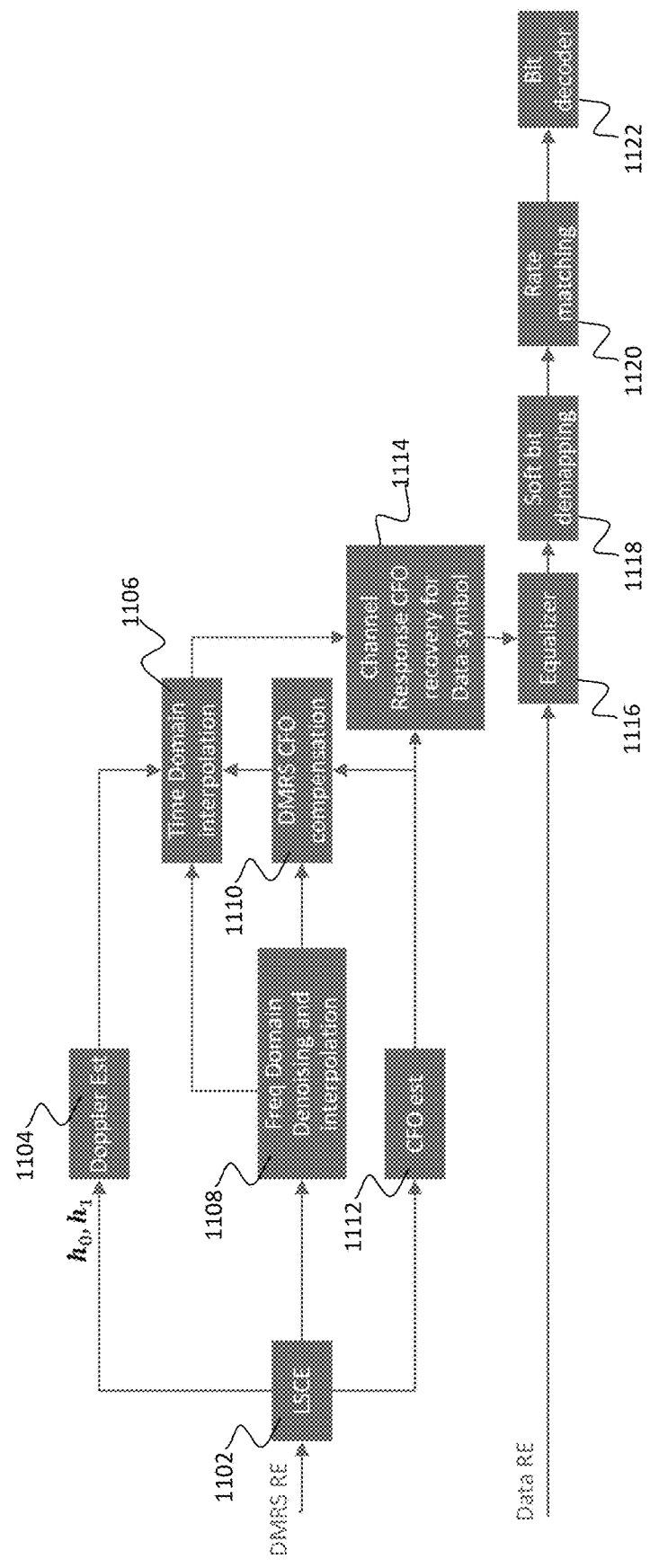
FIG. 11 shows a processing flow in conventional receiver.

FIG. 11 shows a processing flow in conventional receiver. In this figure, the receiver uses the output of a least square channel estimation (LSCE) 1102 to estimate carrier frequency offset (CFO) 1112, Doppler shift 1104, and channel response in frequency domain 1108 on DRMS symbol. A time domain interpolation stage 1106 receives the output of the frequency domain denoising and interpolation 1108 and then channel responses for all OFDM symbols are ready for calculation 1114. The time domain interpolation can be a simple linear interpolation, or a more complex MMSE interpolation, which increases computational complexity but may result in improved performance. The channel response CFO recovery 1114 output may be delivered to an equalizer 1116. The equalizer's output may be used for soft bit demapping 1118. The output of the soft bit demapping may be used for rate matching 1120. The output of the rate matching may be used by the bit decoder 1122.

The time domain interpolation may require an input of the estimated Doppler shift. If MMSE interpolation is used, Doppler shift may be a key parameter to generate the correlation matrix. Alternatively or additionally, Doppler shift can be used to control the interpolation granularity in both linear and MMSE interpolation.

Figures 12, 13:
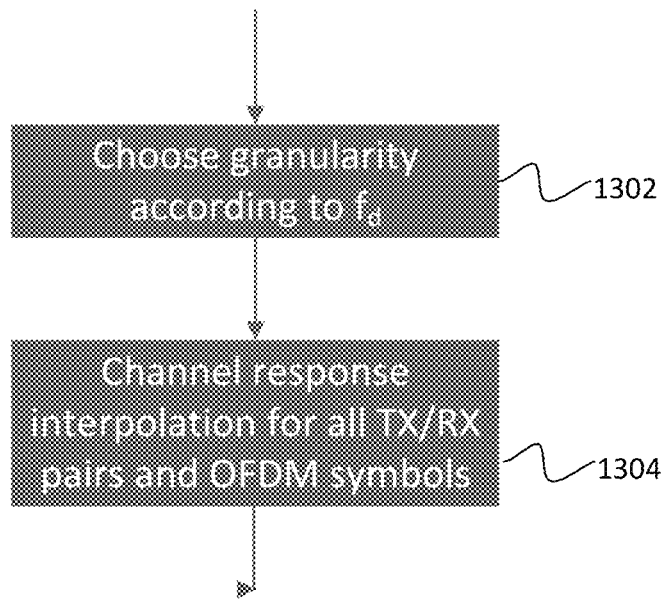
FIG. 12 shows two interpolation granularities, 2 and 6, for the DM-RS configuration of FIG. 10.
FIG. 13 depicts selecting a granularity before actual channel response interpolation.

Interpolation granularity may be understood as a number of successive data symbols on the same subcarrier that share the same channel response from interpolation. FIG. 12 shows two interpolation granularities, 2 and 6, for the DM-RS configuration of FIG. 10. In the first granularity (top granularity), the same channel response is shared by two successive data symbols. In the second granularity (bottom granularity), the same channel response is shared by six successive data symbols. This first granularity (granularity 2; top granularity) may be appropriate, such as when the Doppler shift is large. The second granularity (granularity 6; bottom granularity) may be appropriate used when the Doppler shift is small. When the Doppler shift is low, coarse granularity may be used to reduce computational workload in the equalizer. This may be possible because, when the channel response matrixes on successive OFDM symbols are the same, these symbols only require one matrix inverse operation in the equalizer. When Doppler shift is high, however, finer granularity may be used to obtain better performance.

Doppler shift estimation in conventional receivers works well when the SNR is medium or high. However, NR requires that receivers work under very low SNR. In this harsh condition, the performance of above the estimation method may be suboptimal. At low SNR, the above Doppler shift estimation is unlikely to correctly determine an interpolation granularity, thereby leading to under- or overestimation of granularity. The underestimation of granularity leads to degraded link performance, while the overestimation of granularity unnecessarily increases the computational load.

Thus, a new Doppler shift estimation algorithm and implementation architecture are proposed by first deriving the equation for Doppler shift estimation. This procedure corrects the above-referenced bias problem at low SNR in the conventional algorithm. The proposed new architecture further improves the performance and solves a difficulty in implementation. Comparing to conventional, there is no computational workload increase.

As demonstrated above with respect to FIG. 10, DM-RS symbols may be, for example, allocated on OFDM symbols 2 and symbol 11. The one or more processors may estimate the channel response on the two symbols, $h_0$ and $h_1$, such as by using a least square channel estimation. Assuming that $R_0 = 0.5(h_0^H h_0 + h_1^H h_1)$ and $R_1 = h_0^H h_1$, the CFO $f_0$ and Doppler shift $f_d$ may be estimated as below in conventional receiver:

$$f_0 = \frac{\arg(R_1)}{2\pi T_s} \tag{19}$$

$$f_d = \frac{J_0^{-1}(|R_1|/R_0)}{2\pi T_s} \tag{20}$$

where $T_s$ is time separation between two DM-RS symbol, $J_0^{-1}(x)$ is inverse of 0-th order Bessel function.

The one or more processors may select a granularity before actual channel response interpolation, as depicted in FIG. 13. In this figure, the one or more processors may use the Doppler shift and other inputs for the channel response interpolation to select a granularity according to the Doppler shift 1302, and the one or more processors may perform a channel response interpolation for all transmitter/receiver pairs and OFDM symbols 1304. In general, the one or more processors may select the granularity using a look up table or a fitting function according to Doppler shift estimation in a real receiver.

According to an aspect of the disclosure, the LUT or fitting function may be derived empirically by simulation. In a design phase, several simulations in which varied interpolator granularities for fixed known Doppler shifts may be run. A preferred granularity may be selected for each Doppler shift, such as by selecting a preferred granularity with the performance loss is in a pre-specified range. Based on the selection, an LUT or a fitting function may be generated to correspond to the Doppler shift-granularity pairs from those simulations. The LUT and/or fitting function may be used to decide granularity in the receiver.

In cellular communication, Jake's model is a widely accepted channel model for fast fading. The following equations can be derived from Jake's model and, assuming that the received noise is additive white noise with a power of $\sigma^2$:

$$R(T_s) = \frac{1}{L}E[h_0^H h_1] = \frac{1}{L}e^{j\omega_o T_s}J_0(\omega_d T_s)\sum_{n=0}^{N-1}E[|a_n|^2] \quad (21)$$

$$\underline{R}(0) = \frac{1}{L}E[h_0^H h_0] = \frac{1}{L}E[h_1^H h_1] = \frac{1}{L}\sum_{n=0}^{N-1}E[|a_n|^2] + \sigma^2 \quad (22)$$

in which $a_n$ is a complex amplitude of each multipath in Jake's model, and L is the length of $h_0$ or $h_1$. When SNR is high, noise power $\sigma^2$ can be set to 0 in $\underline{R}(0)$, then the conventional algorithm can be derived from $$\underline{R}(0) \approx \frac{1}{L}E[h_0^H h_0] = \frac{1}{L}E[h_1^H h_1] \text{ and } \underline{R}(T_s) = \frac{1}{L}E[h_0^H h_1].$$

Since $\underline{R}(0)$ is the summation of power of noise and channel response from the above equations, the conventional algorithm is an asymptotically unbiased estimator. This algorithm achieves better performance when the SNR is high, but it may fail when the SNR is low. When signal power is weaker than noise, Doppler shift estimation results are expected to be much higher than actual Doppler shift, which means that significant redundant computation may be introduced in the channel estimation and equalization stage. This may also decrease the interpolation performance if the MMSE interpolation is used.

Procedures for selection of an interpolation granularity are described in detail below.

First, the following describes a set of procedures for Unbiased Doppler Shift Estimation, according to an aspect of the disclosure. The following calculations may be employed to determine Doppler shift:

$$f_d = \frac{1}{2\pi T_s}J_0^{-1}\left(\frac{R(T_s)}{\underline{R}(0) - \sigma^2}\right) \approx \frac{1}{2\pi T_s}J_0^{-1}\left(\frac{|h_0^H h_1|}{0.5(h_0^H h_0 + h_1^H h_1) - L\sigma^2}\right) \quad (23)$$

or $$f_d = \frac{1}{2\pi T_s}J_0^{-1}\left(\frac{R(T_s)}{\underline{R}(0) - \sigma^2}\right) \approx \frac{1}{2\pi T_s}J_0^{-1}\left(\frac{|h_0^H h_1|}{h_0^H h_0 - L\sigma^2}\right) \quad (24)$$

or $$f_d = \frac{1}{2\pi T_s}J_0^{-1}\left(\frac{R(T_s)}{\underline{R}(0) - \sigma^2}\right) \approx \frac{1}{2\pi T_s}J_0^{-1}\left(\frac{|h_0^H h_1|}{h_1^H h_1 - L\sigma^2}\right) \quad (25)$$

in which noise power can be estimated by frequency domain denoise processing.

In this manner, both of $h_0^H h_0 - L\sigma^2$, $h_1^H h_1 - L\sigma^2$ and 0.5 $(h_0^H h_0 + h_1^H h_1) - L\sigma^2$ are unbiased estimations of $\Sigma_{n=0}^{N-1}E[|a_n|^2]$. As such, the resulting estimates of Doppler shift may also be accurate even in low noise scenarios.

Although the above Doppler shift estimation procedures may improve performance problems at low SNRs; they may introduce a new problem. That is, in low SNR scenarios, the estimation of $h_0^H h_0/h_1^H h_1$ are almost the same as $L\sigma^2$, or potentially even larger, since both are mere estimations. Accordingly, in actual implementations, it is expected to frequency occur that $h_0^H h_0 \leq L\sigma^2$, which precludes the above unbiased estimation algorithm from properly functioning.

Figure 14:
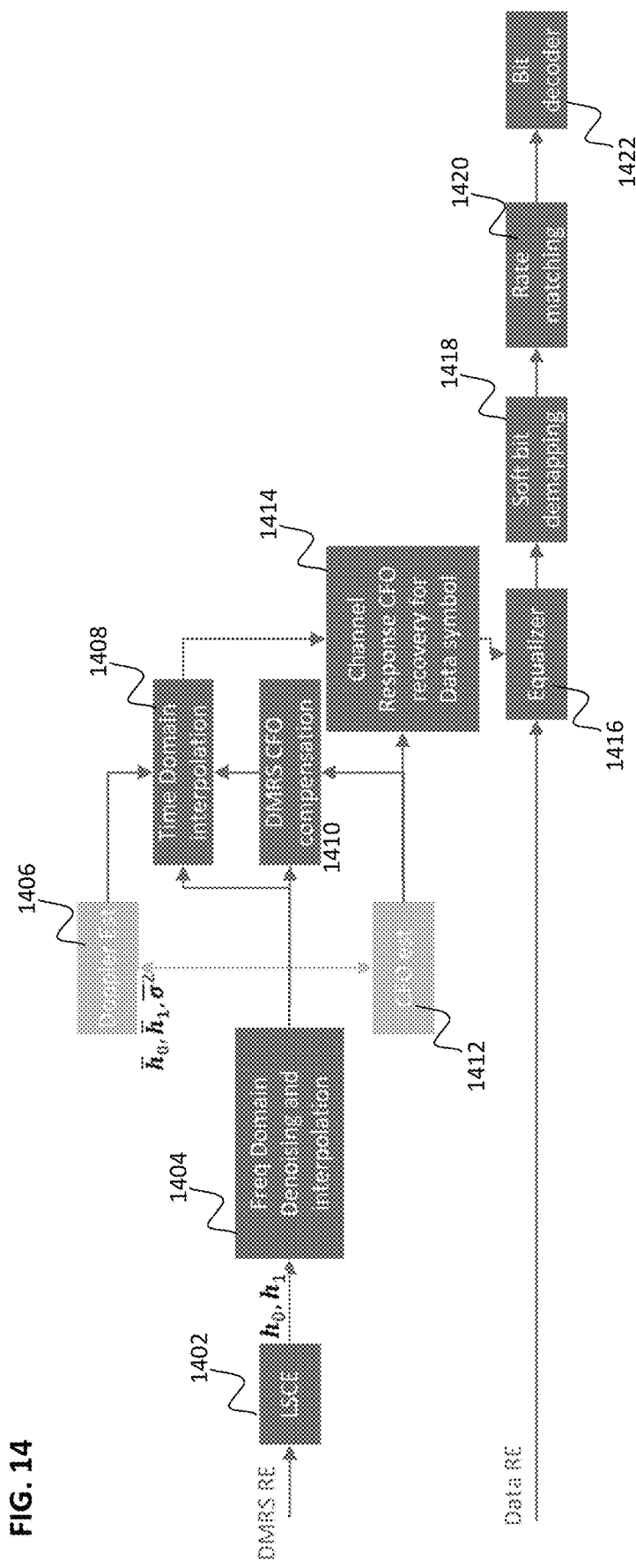
FIG. 14 depicts an enhanced architecture for Doppler shift estimation.

FIG. 14 depicts an enhanced architecture for Doppler shift estimation, according to an aspect of the disclosure. The inputs to the Doppler shift estimation 1406, $\underline{h}_0$ and $\underline{h}_1$, are denoised version of $h_0$ and $h_1$. In the Doppler estimation procedures, $\sigma^{-2}$ may be replaced by $\underline{\sigma}^2$. As a general matter, $\underline{\sigma}^2$ may be understood as the residual noise power in denoised $\underline{h}_0$ and $\underline{h}_1$. Through the denoising operation, the noise in $\underline{h}_0$ and $\underline{h}_1$ is greatly reduced i.e., $\underline{h}_0^H \underline{h}_0$ is generally much larger than $L\underline{\sigma}^2$.

In FIG. 14, the receiver uses the output of a channel estimation 1402, such as for example a least square channel estimation (LSCE) (the output may include a plurality of channel estimations, depicted as $h_0$ and $h_1$) to perform frequency domain denoising and interpolation 1404. The output of the frequency domain D noise and interpolation 1404 may be utilized for time domain interpolation 1408 and DM-RS CFO compensation 1410. The time domain interpolation 1408 may also receive as an input a Doppler estimation 1406. Both the Doppler estimation 1406 and the CFO estimation 1412, may be based, at least in part, on a difference between channel estimations from the LSCE 1402 once they have been D noised and necessary interpolation performed (e.g. as depicted in 1404). The one or more processors may be configured to calculate a channel response CFO recovery for one or more data symbols 1414, which may be calculated based on at least any of an output of the time domain interpolation 1408 and the CFO estimation 1412. The one or more processors may output the channel response CFO recovery for the data symbols to an equalizer 1416. An output of the equalizer may be utilized for soft bit demapping 1418. An output of the soft bit D mapping 1418 may be utilized for rate matching 1420. In output for rate matching 1428 may be utilized by the bit decoder to decode one or more bits 1422.

With respect to the determination of $\underline{\sigma}^2$, it is difficult to determine $\underline{\sigma}^2$ through additional processing. Rather, an empirical method is suggested, such that:

$$\underline{\sigma}^2 = s\sigma^{-2} \quad (26)$$

where s is a scaling factor, which depends on BW, subcarrier spacing, and actual channel condition. The scaling factor s may, for example, be a constant or a variable between 0 and 1.

Figure 15:
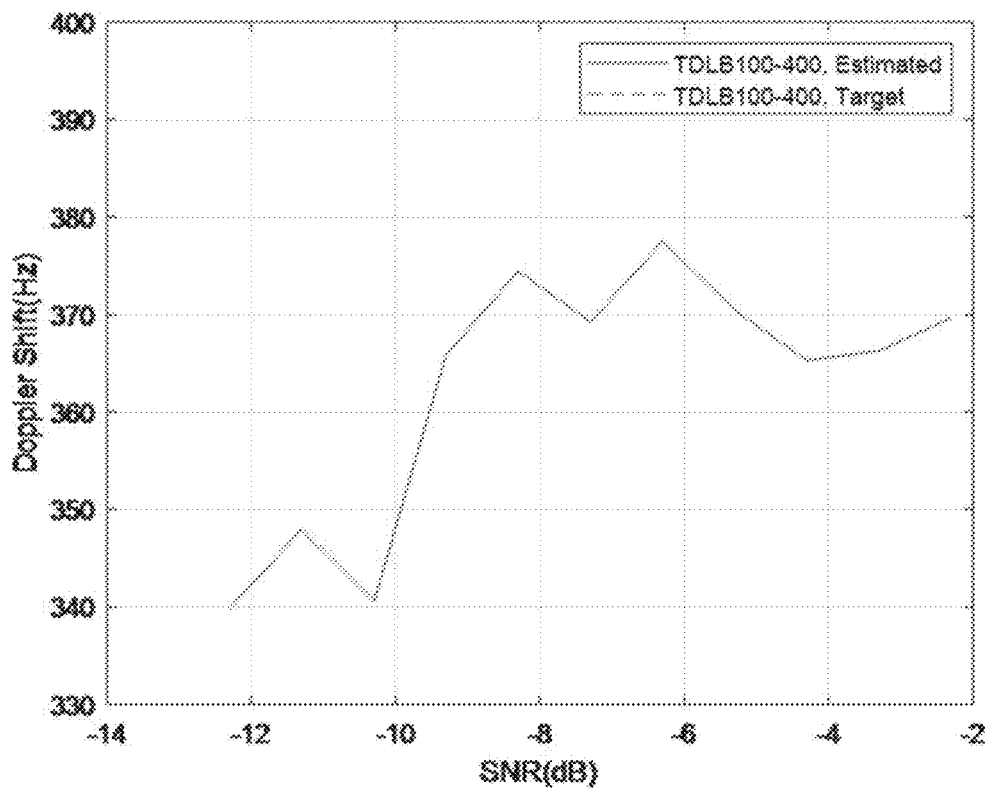
FIGS. 15-17 depict simulation results with s=0.1 for three different channel conditions with same bandwidth.
Figure 16:
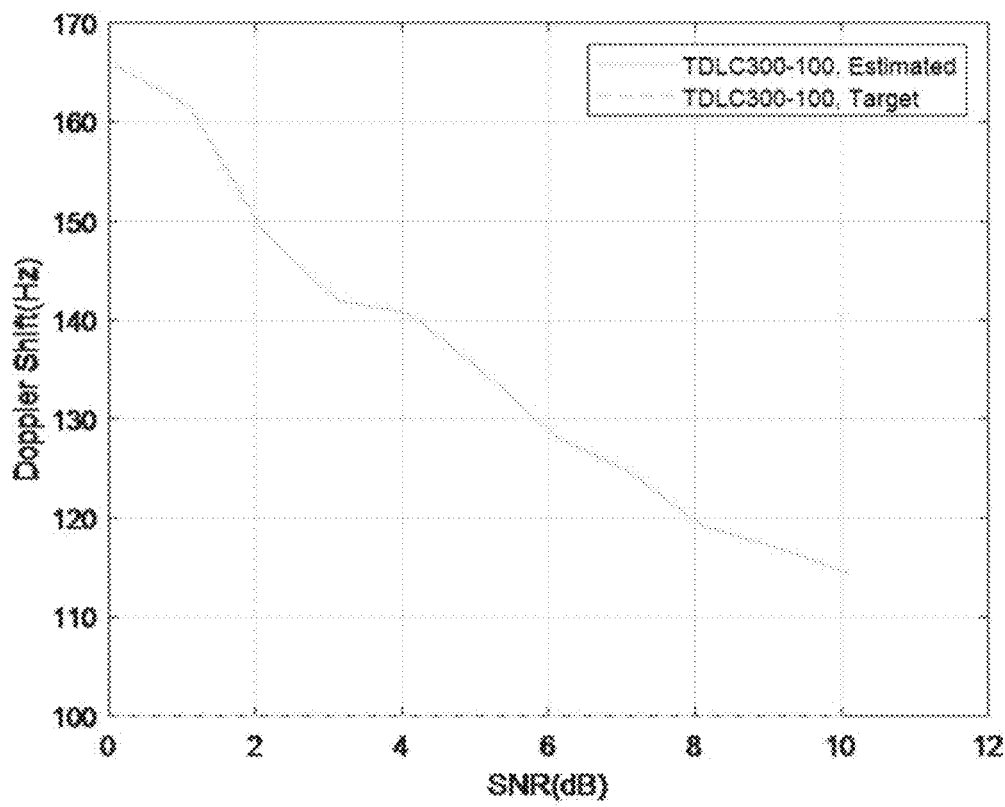
Figure 17:
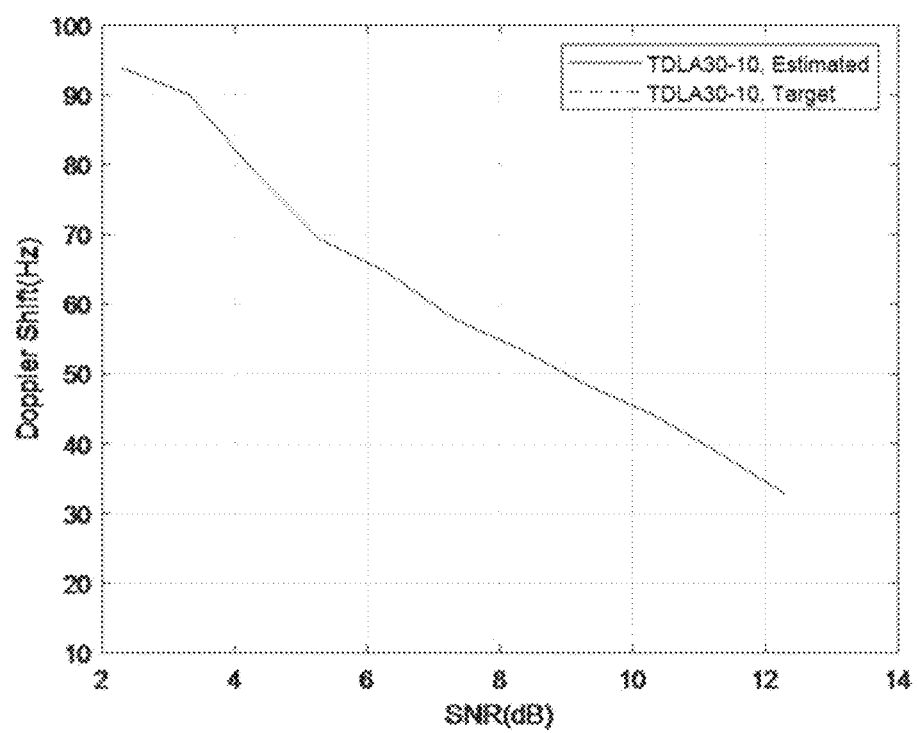

FIGS. 15-17 depict simulation results with s=0.1 for three different channel conditions with same bandwidth. These figures evidence that the fixed s value suitably covers the SNR range from −10 dB to 12 dB in a three channel model. According to an aspect of the disclosure, the s value can be obtained by simulation for another bandwidth. Alternatively or additionally, a fixed s value covering all scenarios may also be acceptable. According to an aspect of the disclosure, the s value may be a constant. According to another aspect of the disclosure, the s value may be a variable, such as a variable that changes relative to a function.

Some denoising algorithms aid in the estimation of the s value. For example, when performing denoising processing, white noise may spread in a whole or a partial OFDM symbol length in the time domain; however, delay spreading may account for only a fraction of the noise spreading. In these situations, the noise resulting from delay spreading may be eliminated. For example, the noise spreading in an NR PUSCH DM-RS configuration 1 is half of symbol length, i.e., 16.7 us at 30 kHz subcarrier spacing, delay spreading is at most 2.5 us. As such, $$s \approx \frac{2.5}{16.7} = 0.15.$$

According to other aspects of the disclosure, the procedures for selecting interpolation granularity as disclosed herein may be further simplified. An inverse of the Bessel function is difficult to compute. It can be approximated by piecewise linear function or other functions such as the polynomial function. In the context of FlexRAN, the following approximation may be used:

$$J_0^{-1}(x) \approx \sqrt{\frac{1-x}{0.223}} \qquad (27)$$

According to an aspect of the disclosure, the principles and methods disclosed herein may also be extended to other DM-RS scenarios. Although only one DM-RS configuration case is discussed in detail, the algorithm and architecture can extend to other DM-RS configurations, such as, for example, those configurations defined in NR or LTE specifications. For example, if DM-RS is configured on 3 position as is defined in the Third Generation Partnership Project (3GPP) Standards TS38.211 ("NR; Physical channels and modulation"), it may be possible to estimate two Doppler offsets $f_d$, one for the first and second DM-RS symbol pair, and the second for the second and the third DM-RS symbol pair. Optionally, an average the two Doppler offsets $f_d$ may be calculated for a final estimation.

Figure 18:
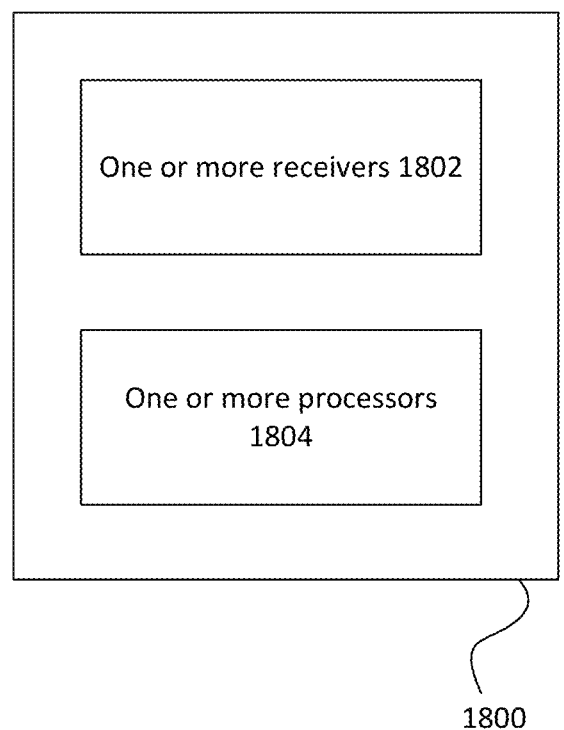
FIG. 18 depicts a radiofrequency device.

FIG. 18 depicts a radiofrequency device 1800 according to an aspect of the disclosure, the radiofrequency device including one or more receivers 1802, configured to receive a first radiofrequency signal representing a first symbol, and send to one or more processors 1804 first data representing the received first radiofrequency signal; receive a second radiofrequency signal representing a second symbol, subsequent to the first symbol, and send to the one or more processors 1804 second data representing the received second radiofrequency signal; and one or more processors 1804, configured to determine from the first data and the second data a signal shift, wherein the signal shift represents relative movement between a transmitter and the radiofrequency device; select a channel estimation parameter based on the signal shift, wherein the channel estimation parameter represents a number of received symbols between channel estimations; and select a third symbol, subsequent to the second symbol, based on the channel estimation parameter; and estimate a channel of the third symbol.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The invention claimed is:

1. A radiofrequency device, comprising:
one or more receivers, configured to:
receive one or more radiofrequency signals representing a plurality of first symbols and a second symbol, as transmitted by one or more first transmitters;
send to one or more processors first data representing the plurality of first symbols, and second data representing the second symbol; and one or more processors, configured to:
determine a plurality of channel estimates of the first data;
estimate a first phase offset value of the one or more first transmitters based on the plurality of channel estimates;
interpolate a second phase offset value as a phase offset of the second data based on the first phase offset value and a number of symbols relative to time between one of the plurality of first symbols and the second symbol;
generate a first phase corrected channel estimate by modifying one of the plurality of channel estimates of the first data by the second phase offset value;
generate a time-interpolated channel estimate by modifying the phase corrected channel estimate based on the number of symbols relative to time between one of the plurality of first symbols and the second symbol;
generate a first inverse-phase corrected time-interpolated channel estimate by modifying the time-interpolated channel estimate by an inverse of the second phase offset value; and
detect the second symbol based at least on the second phase offset value and the inverse-phase corrected time-interpolated channel estimate.

2. The radiofrequency device of claim 1, wherein the one or more first transmitters are common to a single user and have a common frequency offset relative to the radiofrequency device.

3. The radiofrequency device of claim 1, wherein the first data represent a first reference symbol comprising one or more predetermined pilot symbols and the second data represent a second reference symbol comprising one or more predetermined pilot symbols.

4. The radiofrequency device of claim 1, wherein estimating the first phase offset value of the one or more first transmitters based on the plurality of channel estimates comprises estimating the first phase offset value as a difference between two channel estimates of the plurality of channel estimates.

5. The radiofrequency device of claim 1, wherein estimating the first phase offset value of the one or more first transmitters based on the plurality of channel estimates comprises estimating a plurality of phase offset values from the plurality of channel estimates, and determining the first phase offset value as an average of the plurality of phase offset values.

6. The radiofrequency device of claim 1, wherein generating the first phase corrected channel estimate comprises modifying one of the plurality of channel estimates of the first data by the second phase offset value in a frequency domain.

7. The radiofrequency device of claim 1, wherein the one or more receivers are further configured to:
receive one or more radiofrequency signals representing a plurality of third symbols and a fourth symbol, as transmitted by one or more second transmitters;
send to one or more processors third data representing the one or more third symbols, and fourth data representing the fourth symbol; and
wherein the one or more processors are further configured to:
determine a plurality of channel estimates of the third data;
estimate a third phase offset value of the one or more second transmitters based on the plurality of channel estimates of the third data;

interpolate a fourth phase offset value as a phase offset of the fourth data based on the third phase offset value and a number of symbols relative to time between one of the plurality of third symbols and the fourth symbol;

generate a second phase corrected channel estimate by modifying one of the plurality of channel estimates of the third data by the fourth phase offset value;

generate a time-interpolated channel estimate by modifying the phase corrected channel estimate based on a number of symbols between one of the plurality of third symbols and the fourth symbol;

generate a second inverse-phase corrected time-interpolated channel estimate by modifying the time-interpolated channel estimate by an inverse of the fourth phase offset value; and detect the fourth symbol based at least on the fourth phase offset value and the second inverse-phase corrected time-interpolated channel estimate.

8. The radiofrequency device of claim 7, wherein the one or more second transmitters are common to a single user and have a common frequency offset relative to the radiofrequency device.

9. The radiofrequency device of claim 7, further comprising a predetermined frequency offset value representing an average of determined frequency offsets of a plurality of transmitting devices;
wherein the one or more processors are further configured to:
generate average frequency offset data by modifying at least one of the first data or the third data by the predetermined frequency offset value;
wherein determining the plurality of channel estimates of the first data comprises determining the plurality of channel estimates from the average frequency offset data of the first data and/or wherein determining the plurality of channel estimates of the first data comprises determining the plurality of channel estimates from the average frequency offset data of the third data.

10. The radiofrequency device of claim 9, wherein the one or more processors generate the average frequency offset data by modifying at least one of the first data or the third data in a time domain.

11. The radiofrequency device of claim 10, wherein the one or more processors are further configured to transform the average frequency offset data from a time domain to a frequency domain.

12. The radiofrequency device of claim 9, wherein the one or more processors generate the average frequency offset data by modifying at least one of the first data or the third data in a frequency domain.

13. A radiofrequency device comprising:
one or more receivers, configured to:
receive a first radiofrequency signal representing a first symbol, and send to one or more processors first data representing the received first radiofrequency signal;
receive a second radiofrequency signal representing a second symbol, subsequent to the first symbol, and send to the one or more processors second data representing the received second radiofrequency signal; and
one or more processors, configured to:
determine from the first data and the second data a signal shift, wherein the signal shift represents relative movement between a transmitter and the radiofrequency device;
select a channel estimation parameter based on the signal shift, wherein the channel estimation parameter represents a number of received symbols between channel estimations; and
select a third symbol, subsequent to the second symbol, based on the channel estimation parameter; and
estimate a channel of the third symbol.

14. The radiofrequency device of claim 13, wherein the first symbol is a first demodulation reference symbol (DM-RS), the second symbol is a second DM-RS.

15. The radiofrequency device of claim 13, wherein the channel estimation parameter represents a frequency of channel estimation interpolation between DM-RS symbols.

16. The radiofrequency device of claim 13, wherein the signal shift comprises a Doppler shift resulting from relative movement between the transmitter and the receiver.

17. The radiofrequency device of claim 13, wherein determining the signal shift comprises the one or more processors being further configured to:
determine a first channel estimation from the first data and a second channel estimation from the second data;
perform a denoising operation on the first channel estimation and the second estimation; and
estimate the channel based on the denoised first channel estimate, the denoised second channel estimate, and a noise parameter.

18. The radiofrequency device of claim 17, wherein the noise parameter is a residual noise parameter in the denoised first channel estimate and the denoised second channel estimate.

19. The radiofrequency device of claim 17, wherein the noise parameter is calculated as noise power multiplied by a scaling factor.

20. A non-transitory computer readable medium, comprising instructions which, if executed, cause one or more processors to:
receive one or more radiofrequency signals representing a plurality of first symbols and a second symbol, as transmitted by one or more first transmitters;
send to one or more processors first data representing the plurality of first symbols, and second data representing the second symbol; and
determine a plurality of channel estimates of the first data;
estimate a first phase offset value of the one or more first transmitters based on the plurality of channel estimates;
interpolate a second phase offset value as a phase offset of the second data based on the first phase offset value and a number of symbols relative to time between one of the plurality of first symbols and the second symbol;
generate a first phase corrected channel estimate by modifying one of the plurality of channel estimates of the first data by the second phase offset value;
generate a time-interpolated channel estimate by modifying the phase corrected channel estimate based on the number of symbols relative to time between one of the plurality of first symbols and the second symbol;
generate a first inverse-phase corrected time-interpolated channel estimate by modifying the time-interpolated channel estimate by an inverse of the second phase offset value; and
detect the second symbol based at least on the second phase offset value and the inverse-phase corrected time-interpolated channel estimate.

21. The non-transitory computer readable medium of claim 20, wherein the one or more first transmitters are common to a single user and have a common frequency offset relative a radiofrequency device performing the method of carrier frequency offset correction.

22. The non-transitory computer readable medium of claim 20, wherein the first data represent a first reference symbol comprising one or more predetermined pilot symbols and the second data represent a second reference symbol comprising one or more predetermined pilot symbols.

23. A non-transitory computer readable medium, comprising instructions which, if executed, cause one or more processors to:
   receive a first radiofrequency signal representing a first symbol, and send to one or more processors first data representing the received first radiofrequency signal;
   receive a second radiofrequency signal representing a second symbol, subsequent to the first symbol, and sending to the one or more processors second data representing the received second radiofrequency signal; and
   determine from the first data and the second data a signal shift, wherein the signal shift represents relative movement between a transmitter and the method of carrier frequency offset correction;
   select a channel estimation parameter based on the signal shift, wherein the channel estimation parameter represents a number of received symbols between channel estimations;
   select a third symbol, subsequent to the second symbol, based on the channel estimation parameter; and
   estimate a channel of the third symbol.

24. The non-transitory computer readable medium of claim 23, wherein determining the signal shift comprises:
   determining a first channel estimation from the first data and a second channel estimation from the second data;
   performing a denoising operation on the first channel estimation and the second estimation; and
   estimating the channel based on the denoised first channel estimate, the denoised second channel estimate, and a noise parameter.

* * * * *